United States Patent Office 3,814,719
Patented June 4, 1974

3,814,719
s-TRIAZINE-IMIDE COPOLYMERS
Raymond Seltzer, New City, David A. Gordon, Scarsdale, and Paul D. Sherman, Shrub Oak, N.Y., assignors to Ciba-Geigy Corporation, Greenburgh, N.Y.
No Drawing. Filed May 1, 1972, Ser. No. 248,837
Int. Cl. C08g 20/32
U.S. Cl. 260—32.6 N
25 Claims

ABSTRACT OF THE DISCLOSURE

Polyimides having a recurring unit

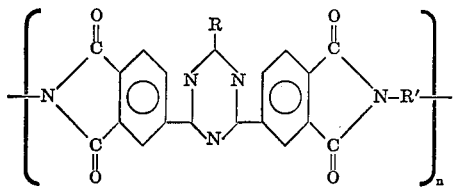

wherein
R is hydrogen, aryl, carbonyl, amino, diaryl amino or a heterocyclic group and R' is an aromatic group, are prepared by reacting an aromatic diamine with a s-triazine dianhydride. These polyimides can be fabricated into films, coatings, laminates and the like. The polyimides are also fusible and moldings thus obtained are low in void content.

---

This invention relates to novel polyimides which are characterized by a recurring unit having the following structural formula:

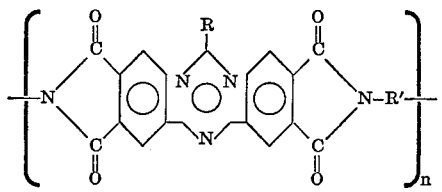

wherein
R is hydrogen, aryl, amino, carboxyl, nitrogen heterocyclic or a diarylamino group and
R' is (a) ortho, meta or para phenylene, biphenylene, naphthylene or anthrylene,
(b) a group having the formula

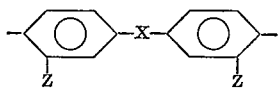

where X is a covalent bond, oxygen, sulfur, alkylene such as methylene, arylene, especially phenylene group, sulfonyl group or a dialkyl or diaryl silyl group and Z is hydrogen, lower alkyl, especially methyl, lower alkoxy, especially methoxy, aryl, especially phenyl, or halogen, especially chlorine,
(c) a group having the formula

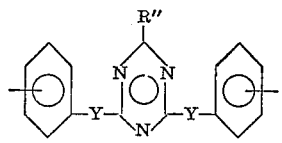

where Y is a covalent bond or —NH— and R" is phenyl or a diphenylamino group, and n is an integer of 2 or more and preferably between 4 and 100.

More specifically, the aryl group of R can be phenyl, naphthyl or biphenylyl, or an aryl group substituted with lower alkyl group, halogen or a lower alkoxy group having up to 4 carbon atoms. Illustrative examples of aryl substituted groups are chlorophenyl, dichlorophenyl, bromophenyl, chloronaphthyl, methoxyphenyl, ethoxyphenyl, butoxyphenyl, tolyl, xylyl, ethylphenyl, diethylphenyl, butylphenyl and the like. Preferably R is phenyl or diphenylamino group. By the "lower alkyl" mentioned above is meant straight or branched chain alkyl groups having up to 4 carbon atoms, such as methyl, ethyl, n-propyl, isopropyl, n-butyl, sec-butyl or t-butyl.

The R group can also be a heterocyclic group containing a nitrogen atoms in the ring. Illustrative examples of such heterocyclic group are:

(a) A group having the structure

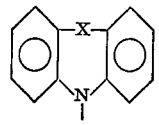

where X is as defined above. When X is a covalent bond the resulting group would be a 9-carbazolyl; when X is oxygen the group would be a 10-phenoxazinyl and when X is sulfur the group would be a 10-phenothiazinyl, (b) a 1-indolyl group having the structure

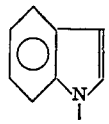

(c) a 2-isoindolyl group having the structure

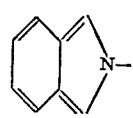

(d) a 1-imidazolyl having the structure

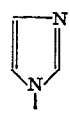

(e) a 1-pyrroloyl having the structure

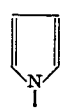

Illustrative examples of R' where it is the group having the formula

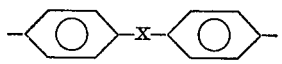

are biphenylene, oxydiphenylene, thiodiphenylene, sulfonyldiphenylene and methylenediphenylene. When R' contains a triazine as shown in (c) above, such group can be illustrated by 4,6-bis(p-phenylene)-s-triazine and 4,6-bis(p-iminophenylene)-s-triazine.

The polyimides of this invention are prepared by a process comprising reacting s-triazine dianhydrides with diamines in an organic reaction medium which is a solvent for at least one of the reactants, preferably under substantially anhydrous conditions, at a temperature below 100° C.

The s-triazine dianhydrides employed in preparing the instant polyimides can be represented by the following structure:

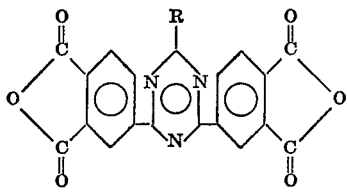

wherein R is as defined above.

These dianhydrides are prepared by reacting a dihalo triazine such as 2-phenyl-4,6-di-chloro-s-triazine, with 2 moles of o-xylene in the presence of aluminum chloride which yields a bis-(o-dimethylphenyl) - s - triazine. This intermediate is oxidized using conventional oxidizing reagents such as potassium permanganate to yield the corresponding tetracarboxylic compounds which, upon heating, yields the dianhydride. The preparation of bis-(o-dimethylphenyl)-s-triazine compounds and of the dianhydride is described in greater detail in the copending applications filed on the same day as the instant application Ser. No. 248,839, filed May 1, 1972 and Ser. No. 248,838, filed May 1, 1972.

Illustrative examples of the s-triazine dianhydrides are:

2-phenyl-4,6-bis-(3',4(-dicarboxyphenyl)-s-triazine dianhydride
2-diphenylamino-4,6-bis-(3',4'-dicarboxyphenyl)-s-triazine dianhydride
2-carboxy-4,6-bis-(3',4'-dicarboxyphenyl)-s-triazine dianhydride
2-p-biphenylyl-4,6-bis-(3',4'-dicarboxyphenyl-s-triazine dianhydride
2,4-bis-(3',4'-dicarboxyphenyl)-s-triazine dianhydride
2-amino-4,6-bis-(3',4-dicarboxyphenyl)-s-triazine dianhydride
2-N-bis(p-biphenylylamino)-4,6-bis-(3',4'-di-carboxyphenyl)-s-triazine dianhydride The amines that can be employed in the preparation of the polyimides of this invention are aromatic diamines in general, including carbocyclic aromatic diamines and s-triazine diamines. Illustrative examples of such diamines are:

4,4'-methylenebis(o-chloroaniline)
3,3'-dichlorobenzidine
3,3'-sulfonyldianiline
4,4'-diaminobenzophenone
1,5-diaminonaphthalene
bis(4-aminophenyl)diethyl silane
bis(4-aminophenyl)diphenyl silane
bis(4-aminophenyl)ethyl phosphine oxide
N-[bis(4-aminophenyl)]N-methyl amine
N-[bis(4-aminophenyl)]N-phenyl amine
4,4'-methylenebis(2-methylaniline)
4,4'-methylenebis(2-methoxyaniline)
4,4'-methylenebis(2-hydroxyaniline)
4,4'-methylenebis(2-methylaniline)
4,4'-oxybis(2-methoxyaniline)
4,4'-oxybis(2-chloroaniline)
4,4'-oxybis(2-hydroxyaniline)
4,4'-thiobis(2-methylaniline)
4,4'-thiobis(2-methoxyaniline)
4,4'-thiobis(2-chloroaniline)
4,4'-sulfonylbis(2-methylaniline)
4,4'-sulfonylbis(2-ethoxyaniline)
4,4'-sulfonylbis(2-chloroaniline)
4,4'-sulfonylbis(2-hydroxyaniline)
3,3'-dimethyl-4,4'-diaminobenzophenone
3,3'-dimethoxy-4,4'-diaminobenzophenone
3,3'-dichloro-4,4'-diaminobenzophenone
4,4'-diaminobiphenyl
m-phenylenediamine
p-phenylenediamine
4,4'-methylenedianiline
4,4'-oxydianiline
4,4'-thiodianiline
4,4'-sulfonyldianiline
4,4'-isopropylidenedianiline
3,3'-dimethylbenzidine
3,3'-dimethoxybenzidine
3,3'-dicarboxybenzidine
2-phenyl-4,6-bis[4-(p-aminophenthioxy)phenyl]-s-triazine
2-diphenylamino-4,6-bis(m-aminoanilino)-s-triazine
2-dimethylamino-4,6-bis(p,p'-aminothiophenoxyphenyl)-s-triazine
2-amino-4,6-bis(p,p'-aminothiophenoxyphenyl)-s-triazine
4,6-bis(m-aminoanilino)-s-triazine
2-piperidino-4,6-bis(p,p'-aminothiophenoxyphenyl)-s-triazine
2-anilino-4,6-bis(p,p'-aminothiophenoxyphenyl)-s-triazine
2-phenyl-4,6-bis-(p,p'-aminothiophenoxyphenyl)-s-triazine
2-phenyl-4,6-bis(p-aminophenyl)-s-triazine
2-phenyl-4,6-bis(m-aminophenyl)-s-triazine
2-diphenylamino-4,6-bis(m and p-aminophenyl)-s-triazine
2-phenyl-bis[4-(4-aminophenoxy)phenyl]-s-triazine
2-phenyl-4,6-bis(p-aminobenzyl)-s-triazine
2-phenyl-4,6-bis(4'-aminoanilino)-s-triazine
2-phenyl-4,6-bis(3'-aminoanilino)-s-triazine
2-anilino-4,6-bis(4'-aminoanilino)-s-triazine
2-(N-methylanilino)-4,6-bis(3'-aminoanilino)-s-triazine
2-dimethylamino-4,6-bis(3'-aminoanilino)-s-triazine
2-dibutylamino-4,6-bis(3'-aminopropylamino)-s-triazine
2-diphenylamino-4,6-bis(2'-aminoanilino)-s-triazine
2-diphenylamino-4,6-bis(4'-aminoanilino)-s-triazine
2-methyl-4,6-bis(8'-aminooctylamino)-s-triazine
2-n-octyl-4,6-bis(4'-aminobutylamino)-s-triazine
2-isopropyl-4,6-bis(4'-aminobutylamino)-s-triazine
2-phenyl-4,6-bis(2'-methyl-4'-aminoanilino)-s-triazine
2-diphenylamino-4,6-bis(3'-aminocyclohexylamino)-s-triazine
2-phenyl-4,6-bis(aminocyclopropylamino)-s-triazine
2-phenyl-4,6-bis(3'-aminopyridinylamino-5'-)-s-triazine
2-piperidino-4,6-bis(3'-aminoanilino)-s-triazine
2,4-bis(3'-aminoanilino)-s-triazine
2-cyclohexyl-4,6-bis(3'-aminoanilino)-s-triazine
2-amino-4,6-bis(3'-aminoanilino)-s-triazine
2-diphenylamino-4,6-bis[4-(p-aminophenoxy)anilino]-s-triazine The product of the reaction between the dianhydride and the diamine is a polyamide acid which may be represented by the following general formula:

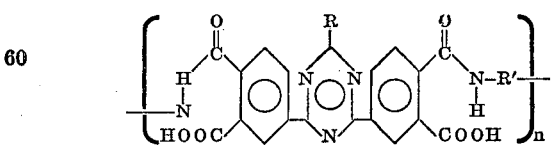

wherein R, R' and n are as defined above.

The above reaction can be carried out conveniently in a number of ways. The s-triazine dianhydride and the diamine can be premixed as dry solids in equimolar amounts and the resulting mixture can be added, in small portions and with agitation, to the organic solvent. This method is particularly effective in reactions which are relatively exothermic. However, it is also possible to add slowly with agitation the solvent to the premixed reactants.

Another variation is to dissolve the diamine in the solvent and then add thereto the s-triazine dianhydride at a rate that provided a controllable rate of reaction. It is also possible to add the reactants separately and in small portions to the solvent or to dissolve the reactants in separate portions of the solvent and then slowly adding the two solutions to the reaction vessel.

The degree of polymerization of the polyamide acid is subject to a deliberate control. The use of equal molar amounts of the reactants under the prescribed conditions provides polyamide acids of every high molecular weight. The use of either reactant in large excess limits the extent of polymerization. However, the scope of the process encompasses the use of up to 5% excess of either the diamine or the dianhydride. More than 5% excess of either reactant results in an undesirably low molecular weight polyamide acid. For some purposes, it is desirable to use 1–3% excess of either reactant, preferably the dianhydride. Besides using an excess of one reactant to limit the molecular weight of the polyamide acid, a chain terminating agent such as phthalic anhydride or aniline may be used to "cap" the ends of the polymer chains.

In the preparation of the polyamide acid intermediate, it is essential that the molecular weight be such that the inherent viscosity of the polyamide acid is at least 0.05, preferably 0.1–5.0. The inherent viscosity is measured at 30° C. at a concentration of 0.5% by weight of the polymer in a suitable solvent, e.g., N,N-dimethylacetamide, N-methylpyrrolidone, dimethylformamide, etc. To calculate inherent viscosity the viscosity of the polymer solution is measured relative to that of the solvent alone.

$$\text{Inherent viscosity} = \frac{\text{natural logarithm} \times \frac{\text{Viscosity of solution}}{\text{Viscosity of solvent}}}{C}$$

wherein C is the concentration expressed in grams of polymer per 100 milliliters of solution. As known in the polymer art inherent viscosity is directly related to the molecular weight of the polymer.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 40% of the polymeric solution. That is, the solution should contain 0.05–60% of the polymeric component. The viscous solution of the polymeric composition containing 10 to 60% polyamide acid in the polymeric component dissolved in the solvent may be used as such for forming shaped structures. The shaped articles containing the polyamide acid are then converted to the respective polyimide shaped articles.

The solvents useful in the solution polymerization process for synthesizing the intermediate polyamide acid compositions in the process of preparing the polyimides are the organic solvents whose functional groups do not react with either of the reactants (the diamines or the dianhydrides) to a greater extent than the reactants, preferably for both of the reactants. The normally liquid organic solvents of the N,N-dialkylcarboxylamide class are useful as solvents in the process of this invention. The preferred solvents are the lower molecular weight members of this class, particularly N,N-dimethylformamide, N,N-dimethylacetamide and N-methyl-2-pyrrolidone. They may easily be removed from the polyamide acid and/or polyamide acid shaped articles by evaporation, displacement or diffusion. Other typical compounds of this useful class of solvents are:

N,N-diethylformamide
N,N-diethylacetamide
N-methylcaprolactam
dioxane
dimethylsulfoxide
tetramethylurea
pyridine
dimethylsulfone
hexamethylphosphoramide
tetramethylene sulfone
formamide
N-methylformamide
butyrolactone The solvents can be used alone, in combinations of solvents, or in combination with poor solvents such as benzene, benzonitrile, dioxane, xylene, toluene and cyclohexane.

To determine a specific time and a specific temperature for forming the polyamide acid of one of the specified diamines and a specified dianhydride, several factors must be considered. The maximum permissible temperature will depend on which particular diamine is used, the dianhydride used, the particular solvent, the percentage of polyamic acid desired in the final composition and the minimum period of time that one desired for the reaction. For most combinations of s-triazine dianhydrides and the diamines falling within the definitions given above, it is possible to form compositions of 100% polyamic acid by conducting the reaction below 100° C. However, temperatures up to the boiling point of the solvent or higher when pressure equipment is employed may be tolerated to provide shapable compositions. However, to obtain the maximum inherent viscosity, i.e., maximum degree of polymerization, for any particular combination of s-triazine dianhydride, diamine, solvent, etc., and thus produce shaped articles such as films and filaments of optimum toughness, it has been found that the temperature throughout the reaction should be maintained below 125° C.

The polyamic acid prepared as described above can be isolated by evaporating the solvent at temperatures lower than 70° C. The polyamic acid is soluble in organic solvents.

The polyamide acid may be converted to polyimide by a variety of methods. One method comprises converting the polyamic acid by heating it above 50° C. Heating serves to convert pairs of amide and carboxylic acid groups to imide groups. Heating may be conducted for a period of a few seconds to several hours. Imidization can be accomplished when the polyamide acid is either in solid form or in solution. It has been found that after the polyamide acid has been converted to the polyimide in accordance with the above described heat conversion, if the polyimide is further heated to a temperature of 300°–500° C. for a short period, improvements in the thermal and hydrolytic stabilities of the polyimide are obtained.

A second method for converting the polyamide acid composition to the polyimide thereof is a chemical treatment and involves treating the polyamic acid composition with a dehydrating agent alone or in combination with a tertiary amine, e.g., acetic anhydride or an acetic anhydride-pyridine mixture. The polyamide acid shaped article can be treated in a bath containing the acetic anhydride-pyridine mixture. The ratio of acetic anhydride to pyridine may vary from just above zero to infinite mixtures. It is believed that the pyridine functions as a catalyst for the action of the cyclizing agent, the acetic anhydride. Other possible dehydrating agents for use include propionic anhydride, butyric anhydride, valeric anhydride and mixed lower fatty-acid anhydrides. Other tertiary amine catalysts include triethylamine, isoquinoline, α or β or gamma-picoline, 2,5-lutidine, etc.

A third method for conversion involves treatment with a carbodiimide, e.g., dicyclohexylcarbodiimide. The carbodiimide also serves to dehydrate the polyamic acid and to act as an effective cyclyzing agent.

As a fourth method of conversion, a combination treatment may be used. The polyamide acid may be partially converted to the polyimide in a chemical conversion treatment and then cyclization to the polyimide may be completed by subsequent heat treatment.

It should be understood that instead of shaping the polyamide acid composition into the usual articles, the polyamic acid composition in the solvent may be used as a liquid coating composition. Such coating compositions may be pigmented with such compounds as titanium dioxide in amounts of 5–200% by weight. These coating compositions may be applied to a variety of substrates, for example, metals, e.g., copper, brass, aluminum, steel, etc., the metals in the form of sheets, fibers, wires, screening, etc.; glass in the form of sheets, fibers, foams, fabrics, etc.; polymeric materials, e.g., cellulosic materials such as cellophane, wood, paper etc., polyolefins such as polyethylene, polypropylene, polystyrene, etc., perfluorocarbon polymers such as, polytetrafluoroethylene, copolymers of tetrafluoroethylene with hexafluoropropylene, etc., polyurethanes, all polymeric materials in the form of sheets, fibers, foams, woven and non-woven fabrics, screening, etc.; leather sheets; etc. The polyamic acid coatings are then converted to polyimide coatings by one or more of the processes to be described.

The polyimides of this invention find many applications in a wide variety of physical shapes and forms. Among the most significant of these forms are films and fibers. The useful combination of the desirable physical and chemical characteristics of this polymer is unique. Films and fibers of this polymer not only possess excellent physical properties at room temperature, but retain their strength and excellent response to work-loading at elevated temperatures for prolonged periods of time. Behavior of this type offers commercial utility in a wide range of end uses. These polyimide polymers display excellent resistance to strong acids and alkalies, to corrosive atmosphere, outstanding resistance to degradation by high energy particles and gamma ray radiation. The polymer resists melting upon exposure at 500° C. for extended periods while retaining hitherto unrealized high proportions of room temperature physical properties. Because of the unusual and surprising solubility of the polymer precursor may be processed into shaped articles such as films and fibers by conventional techniques and then converted in situ to the polyimide polymer. Solutions of the s-triazine containing polyamide acids or polyimides can be used to impregnated reinforcing fibers and fabrics like glass, boron, metal oxide whiskers and graphite. These prepregs can then be cured to form rigid polyimide laminates or composites or to form strong thermally resistant structural adhesive bonds between aluminum, stainless steel, titanium or other metals.

Films formed from the polymer of this invention may be used wherever films have heretofore been used. They serve advantageously in an extensive variety of wrapping, packaging and bundling applications. Additionally, the polymer and film-forming polymer may be used in automobile and aviation interior head lining materials, decorative trim, high temperature electrical insulation such as for slot liners, in dry transformers, capacitors, cable wrappings, etc., packaging of items to be exposed to high temperature or high energy radiation while within the package, corrosion-resistant pipe, duct work, containers and container linings, and laminating structures where the films are bonded to the sheet metal or foils, and a variety of other similar and related uses. In fiber form, the polymer offers possibilities for high temperature electrical insulation, protective clothing and curtains, filtration media, packing and gusseting materials, brake linings and clutch facings.

Soluble polyimides are obtained when R is phenyl and R' is 2-diphenylamino-4,6-bis(m- or p-phenylanilino)-s-triazine or the group having the structure

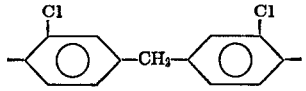

When R is diphenylamino group soluble polyimides are obtained when R' is
(a) meta- or para-phenylene
(b) a group having the structure

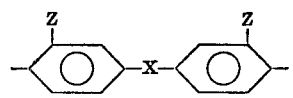

where X is a covalent bond, methylene, oxygen, sulfur, sulfone or carbonyl and Z is hydrogen, chlorine, hydroxyl, carboxyl, carbethoxyl or methyl, or
(c) 2-diphenylamino-4,6-bis(m- or p-phenylanilino).

EXAMPLE 1

Preparation of polyimide from 4,4'-oxydianiline (ODA) and 2-diphenylamino-4,6-bis(3',4'-dicarboxyphenyl)-s-triazine dianhydride (DTDA)

To a solution of 4.005 g. (0.020 mole) of ODA in 30 g. of N-methylpyrrolidone at room temperature was added 10.80 g. (0.020 mole) of DTDA in three portions over a 30 minute period; 15 g. of N-methylpyrrolidone was also added. The solution was stirred overnight at room temperature. The temperature was raised to 70°–80° C. to dissolve a small amount of unreacted DTDA, and then cooled to room temperature. Inherent viscosity of polyamic acid equal 0.88.

The polyamic acid solution was cast on an aluminum sheet and cured at 25°–180° C. for 1.5 hours, and then at 180°–350° C. for 1 hour. The resulting polyimide film was tough and flexible having a Tg of 350°–360° C.

A portion of the polyamic solution was heated in an oil bath at 190° C. for 1 hour. The resulting polyimide remained in solution until cooled below 100°–120° C. Reheating to 100°–120° C. gave back the polyimide solution. Adding the polyimide solution to acetone precipitated the polyimide which was filtered, washed with acetone and dried. The polyimide powder was dissolved in tetrachloroethane. It was also soluble in hot N-methylpyrrolidone and nitrobenzene.

The remaining portion of the polyamic solution was added to a solution of 25 ml. of acetic anhydride and 60 ml. of pyridine at room temperature. The resulting mixture was stirred at room temperature for 30 minutes and then treated with acetone. The polyimide was isolated as described, and had equivalent solubilities to the polyimide obtained from the thermal imidization.

EXAMPLE 2

Preparation of polyimide from 4,4'-methylene dianiline (MDA) and 2-diphenylamino-4,6-bis(3',4'-dicarboxyphenyl)-s-triazine dianhydride (DTDA)

Equimolar amounts of MDA and DTDA were polymerized as described in Example 1. Inherent viscosity equals 0.36. Curing the polyamic acid in the usual way gave the polyimide film.

The polyamic acid was thermally imidized as described in Example 1. The polyimide was soluble in N-methylpyrrolidone and tetrachloroethane at room temperature. It was also soluble in nitrobenzene at elevated temperatures.

EXAMPLE 3

Preparation of polyimide from meta-phenylenediamine (MPDA) and 2-diphenylamino-4,6-bis(3',4'-dicarboxyphenyl)-s-triazine dianhydride (DTDA)

Equimolar amounts of m-phenylenediamine and DTDA were polymerized as in Example 1 except that the addition of DTDA was at 70°–80° C. Inherent viscosity was 0.23.

EXAMPLE 4

Preparation of polyimide from 4,4'-methylenebis(2-chloroaniline) (MOCA) and 2-diphenylamino-4,6-bis-(3',4'-dicarboxyphenyl)-s-triazine dianhydride (DTDA)

Following the procedure of Example 1, equimolar amounts of MOCA and DTDA are reacted to form the polyamic acid which, upon curing, gives the corresponding polyimide which has good high temperature properties and which is soluble in the solvents mentioned in Example 1.

EXAMPLE 5

Preparation of polyimide from 2-diphenylamino-4,6-bis-(meta-aminoanilino)-s-triazine (DPAAT) and 2-diphenylamino - 4,6-bis(3',4'-dicarboxyphenyl)-s-triazine dianhydride (DTDA)

Equimolar amounts of DPAAT and DTDA were polymerized as in Example 3. Curing the polyamic acid gave the polyimide film.

Thermal imidization followed by precipitation with acetone gave the polyimide soluble in N-methylpyrrolidone, dimethylacetamide, dioxane and tetrachloroethane at room temperature.

EXAMPLE 6

Preparation of polyimide from 2-phenyl-4,6-bis(p-aminophenyl)-s-triazine (PAPT) and 2-diphenylamino-4,6-bis(3',4' - dicarboxyphenyl) - s - triazine dianhydride (DTDA)

A polymerization of equimolar amounts of PAPT and DTDA as in Example 3 gave the polyamic acid, which upon curing, gave the polyimide film having a Tg of 395° C.

EXAMPLE 7

Preparation of polyimide from 2-carboxy-4,6-bis(3',4'-dicarboxyphenyl)-s-triazine dianhydride and 4,4'-diaminodiphenylsulfide Following the procedure of Example 3, the diamine and the dianhydride monomers are polymerized in equimolar amounts. The resulting polyamic acid is cured to yield the corresponding polyimide.

EXAMPLE 8

Preparation of polyimide from 4,6-bis(3',4'-dicarboxyphenyl)-s-triazine dianhydride and 4,4'-diaminodiphenyl Following the procedure of Example 3, the above noted monomers are polymerized in equimolar quantities. The resulting polyamic acid is cured to yield the corresponding polyimide.

EXAMPLE 9

Preparation of polyimide from 4,4'-oxydianiline (ODA) and 2-phenyl-4,6-bis(3',4'-dicarboxyphenyl)-s-triazine dianhydride (PTDA)

To a solution of 2.002 g. (0.010 mole) of ODA in 20 ml. of N-methylpyrrolidone (NMP) at 100° C. was added 4.493 g. (0.010 mole) of PTDA in three portions over a 30 minute period, 25 ml. of NMP was also added. The reaction was maintained at 95°–100° C. for an additional hour before cooling to room temperature and stirred at room temperature for 17 hours. The polyamic acid had an inherent viscosity of 1.12.

The polyamic acid was cast on an aluminum sheet and cured at 25° C.–180° C. over a 1.5 hour period and then at 180° C.–350° C. for 1 hour. The resulting polyimide film was tough and flexible.

EXAMPLE 10

Preparation of polyimide from 4,4'-methylenedianiline (MDA) and 2-phenyl-4,6-bis(3',4'-dicarboxyphenyl)-s-triazine dianhydride (PTDA)

Equimolar amounts of MDA and PTDA were polymerized as in Example 8. The polyamic acid had an inherent viscosity of 0.75. Curing as in said example gave a polyimide film which had a Tg of 353° C.

EXAMPLE 11

Preparation of polyimide from meta-phenylenediamine (MPDA) and 2-phenyl-4,6-bis(3',4'-dicarboxyphenyl)-s-triazine dianhydride (PTDA)

Equimolar amounts of MPDA and PTDA were polymerized as in Example 8 except that the addition of PTDA was at room temperature. After the addition was complete it was necessary to heat to 50° C. to dissolve all the PTDA. The inherent viscosity was 0.49. Curing the polyamic acid gave a polyimide film.

EXAMPLE 12

Preparation of polyimide from 2-phenyl-4,6-bis(p-aminophenyl)-s-triazine (PAPT) and 2-phenyl-4,6-bis(3',4'-dicarboxyphenyl)-s-triazine dianhydride (PTDA)

The polymerization of PAPT and PTDA was carried out as in Example 8 yielding the product which had the inherent viscosity of 1.05. Curing the polyamic acid at 170° C. thereafter raising the temperature to 350° C. over a 1 hour period and maintaining it at 350° C. for 1 hour gave a flexible film.

EXAMPLE 13

Preparation of polyimide from 2-diphenylamino-4,6-bis(meta-aminoanilino)-s-triazine (DPAAT) and 2-phenyl-4,6-bis(3',4'-dicarboxyphenyl)-s-triazine dianhydride (PTDA)

The polymerization of the above monomers was carried out in equimolar quantities as described in Example 8 yielding a polyamic acid having an inherent viscosity of 0.40. Curing the polyamic acid as described in Example 11 gave a flexible polyimide film. Imidizing the polyamic acid in N-methylpyrrolidone resulted in a soluble polyimide.

A glass cloth (181 E Glass, A 1100 finish sold by J. P. Stevens) was impregnated with the soluble polyimide prepared above. A 10 ply laminate was prepared using 400 p.s.i. at 650° F.

Another portion of the polyimide solution was treated with water to precipitate the polyimide powder. After drying, the powder was molded for one hour using 3000 p.s.i. at 650° F. The resulting plaques were tough and void-free.

EXAMPLE 14

Preparation of polyimide from 4,4'-methylenedianiline (MDA) and 2 - diphenylamino-4,6-bis(3',4'-dicarboxyphenyl)-s-triazine dianhydride (DTDA)

MDA and DTDA were polymerized as in Example 2 except that a 3% by weight excess of DTDA was employed. The resulting polyamic acid had an inherent viscosity of 0.58. When this example was repeated using 5% excess of DTDA the resulting polyamic acid had an inherent viscosity of 0.82.

EXAMPLE 15

Preparation of polyimide from 4,4'-methylenebis(o-chloroaniline) (MOCA) and 2 - phenyl-4,6-bis(3',4'-dicarboxyphenyl)-s-triazine dianhydride (PTDA)

Following the procedure of Exampjle 8 the above named monomers are polymerized to yield a polyamic acid. Upon curing as described in Example 8, a flexible polyimide film is obtained.

EXAMPLE 16

Following the procedure of Example 1, 2-(9-carbazolyl) - 4,6-bis(3',4'-dicarboxyphenyl)-s-triazine dianhydride is reacted with MDA to yield the polyamic acid. Upon curing as described in Example 8, a flexible polyimide film is obtained.

EXAMPLE 17

Following the procedure of Example 1, 2-(1-imidazolyl) - 4,6-bis(3',4'-dicarboxyphenyl)-s-triazine dianhydride is reacted with ODA to yield the corresponding amic acid which cures to yield the polyimide.

What is claimed is:

1. A polyimide consisting essentially of the recurring unit having the structure

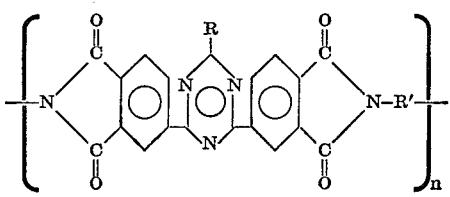

wherein

R is hydrogen, aryl, amino, carboxyl, nitrogen containing heterocyclic group or diarylamino group, n is an integer of 2 or more, R' is
(a) ortho, meta or para phenylene, biphenylene, naphthylene or anthrylene,
(b) a group having the formula

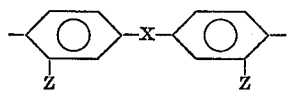

where X is a covalent bond, oxygen, sulfur, sulfonyl or a methylene group and Z is hydrogen, halogen, lower alkyl, lower alkoxyl, aryl or hydroxy group, or
(c) a group having the formula

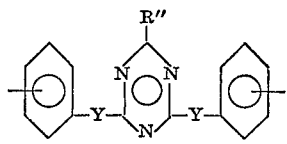

wherein R'' is phenyl or a diphenylamino group, and Y is a covalent bond or —NH— group.

2. A polyimide of claim 1 wherein R is phenyl.
3. A polyimide of claim 1 wherein R is diphenyl amino group.
4. A polyimide of claim 1 wherein R is a nitrogen heterocyclic group having the structure (a) 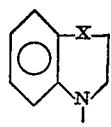

wherein X is as defined in claim 1, (b) 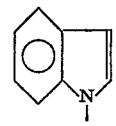

(c) 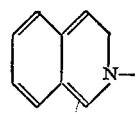

(d) 

or (e) 

5. A polyimide of claim 1 wherein R' is ortho, meta or para phenylene.
6. A polyimide of claim 1 wherein R' is a group having the structure

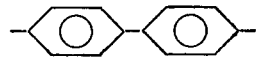

7. A polyimide of claim 1 wherein R' is a group having the structure

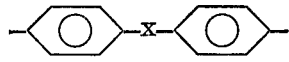

wherein X is methylene, sulfur, sulfonyl or oxygen.

8. A polyimide of claim 1 wherein R' is a group having the structure

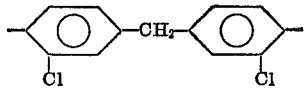

9. A polyimide of claim 1, wherein R is diphenylamino and R' is a group having the formula

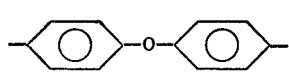

10. A polyimide of claim 1, wherein R is diphenylamino and R' is a group having the formula

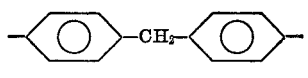

11. A polyimide of claim 1, wherein R is diphenylamino and R' is meta-phenylene.
12. A polyimide of claim 1, wherein R is diphenylamino and R' is a group having the formula

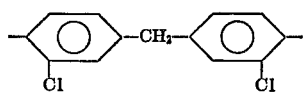

13. A polyimide of claim 1, wherein R is diphenylamino and R' is a group having the formula

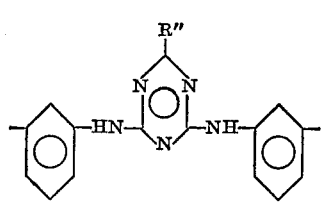

wherein R'' is diphenylamino.

14. A polyimide of claim 1, wherein R is diphenylamino and R' is a group having the formula

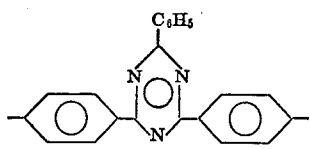

15. A polyimide of claim 1, wherein R is phenyl and R' is a group having the formula

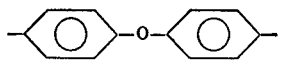

16. A polyimide of claim 1, wherein R is phenyl and R' is a group having the formula

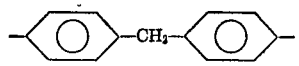

17. A polyimide of claim 1, wherein R is phenyl and R' is meta-phenylene.

18. A polyimide of claim 1, wherein R is phenyl and R' is a group having the formula

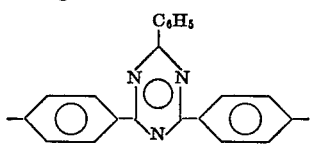

19. A polyimide of claim 1 wherein R is phenyl and R' is a group having the structure

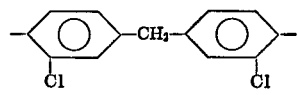

20. A polyimide of claim 1, wherein R is phenyl and R' is a group having the formula

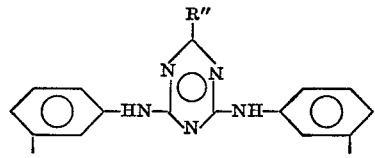

where R" is diphenylamino.

21. A solution consisting essentially of a polyimide having the recurring unit

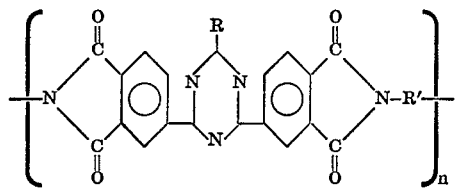

wherein
R is diphenylamino,
R' is
  (a) meta or para-phenylene,
  (b) a group having the structure

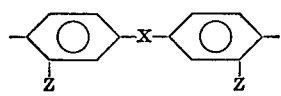

where X is oxygen, sulfur, sulfonyl or methylene, and Z is hydrogen, lower alkyl or halogen, or
  (c) 2-diphenylamino-4,6-bis(m- or p-phenylanilino

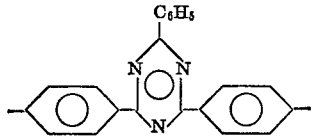

and an organic solvent therefor whose functional groups do not react with either of the reactants to a greater extent than the reactants.

22. A solution consisting essentially of a polyimide having the recurring unit

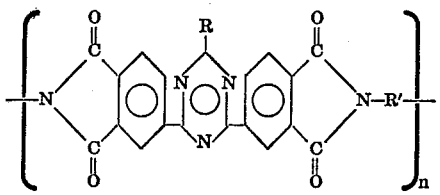

wherein
R is phenyl and
R' is a group having the structure (a)

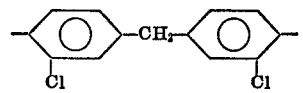

or (b)

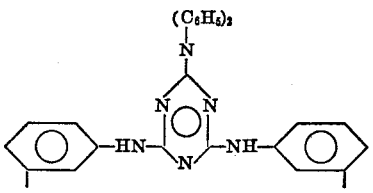

and a N,N-dialkylcarboxylamide solvent.

23. A polyamic acid consisting essentially of the recurring unit having the formula

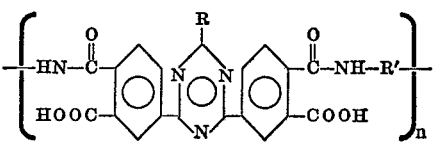

wherein

R is hydrogen, aryl, amino, carboxyl, nitrogen containing heterocyclic group or a diarylamino group,
n is an integer of from 2 or more,
R' is
  (a) ortho, meta or para phenylene, biphenylene, naphthylene or anthrylene,
  (b) a group having the formula

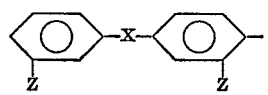

where X is a covalent bond, oxygen, sulfur, sulfonyl or a methylene group and Z is hydrogen, halogen, lower alkyl, lower alkoxyl, aryl or hydroxy group, or
  (c) a group having the formula

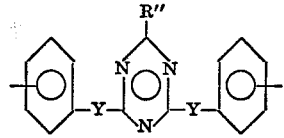

wherein R" is phenyl or a diphenylamine group, and Y is a covalent bond or —NH— group and said polyamic acid has an inherent viscosity of at least 0.05 measured at 30° C. at a concentration of 0.05% by weight of the polymer in a solvent selected from the group consisting of n,n.dimethylacetamide, n-methylpyrrolidone and dimethylformamide.

24. A film which consists essentially of a polyimide of claim 1.

25. A molding powder consisting essentially of a polyimide of claim 1.

References Cited

UNITED STATES PATENTS 3,342,768  9/1967  Chalmers _____ 260—32.6
3,642,720  2/1972  Kray et al. _____ 260—78.4 R
3,666,723  5/1972  Kray et al. _____ 260—65

LESTER L. LEE, Primary Examiner

U.S. Cl. X.R.

117—124 E, 132 B, 138.8 D, 138.8 E, 138.8 UF, 142, 143 A, 148, 155 R, 228, 161 P; 161—197, 214, 227; 260—30.2, 30.4 N, 30.6 R, 30.8 R, 30.8 DS, 32.2, 32.4, 37 N, 63 R, 78 TF, 243 A, 248 CS, 249.5, 249.6